(12) United States Patent
Kalyanasundaram

(10) Patent No.: US 12,234,925 B2
(45) Date of Patent: Feb. 25, 2025

(54) SENSING ARRANGEMENT FOR VALVES

(71) Applicant: Emerson Automation Solutions Final Control US LP, Houston, TX (US)

(72) Inventor: Vishwa Kalyanasundaram, Stafford, TX (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 5 days.

(21) Appl. No.: 18/302,226

(22) Filed: Apr. 18, 2023

(65) Prior Publication Data

US 2023/0332716 A1    Oct. 19, 2023

Related U.S. Application Data

(60) Provisional application No. 63/331,957, filed on Apr. 18, 2022.

(51) Int. Cl.
| F16K 37/00 | (2006.01) |
| F16K 17/06 | (2006.01) |

(52) U.S. Cl.
CPC .......... *F16K 37/0083* (2013.01); *F16K 17/06* (2013.01)

(58) Field of Classification Search
CPC .. F16K 17/06; F16K 37/0083; F16K 37/0091; Y10T 137/8158; Y10T 137/8225; Y10T 137/8326
See application file for complete search history.

(56) References Cited

U.S. PATENT DOCUMENTS

| 2,813,539 | A | * | 11/1957 | Farris | F16K 17/08 137/499 |
| 3,027,916 | A | * | 4/1962 | Smith | F16K 17/087 137/557 |
| 4,461,316 | A | * | 7/1984 | Cove | E21B 34/02 251/363 |
| 4,708,164 | A | | 11/1987 | Scallan | |
| 6,161,571 | A | * | 12/2000 | Taylor | G05D 16/16 137/488 |
| 8,607,818 | B2 | * | 12/2013 | Monroe | F16K 25/00 137/478 |
| 2002/0029808 | A1 | * | 3/2002 | Friend | F16K 17/06 137/551 |

(Continued)

FOREIGN PATENT DOCUMENTS

| CN | 113404873 A | 9/2021 |
| JP | 2002310333 A | 10/2002 |

OTHER PUBLICATIONS

Anderson Greenwood Series 200/400/500/700/800 Pilot Operated Relief Valves Product Catalog, www.Emerson.com/FinalControl, 2017, 64 pages.

(Continued)

*Primary Examiner* — Jessica Cahill
(74) *Attorney, Agent, or Firm* — Quarles & Brady LLP

(57) ABSTRACT

A sensing arrangement for a relief valve having a valve body can include a valve body engagement member and a first sensor. The valve body engagement member can be secured to the valve body proximate to a valve seat of the relief valve. The first sensor can be in communication with the valve seat via the valve body engagement member. The first sensor can be configured to detect a valve event via detection of localized pressure changes at the valve seat.

19 Claims, 11 Drawing Sheets

(56) References Cited

U.S. PATENT DOCUMENTS

| | | | | |
|---|---|---|---|---|
| 2002/0062682 | A1* | 5/2002 | Kumpfmueller | ... F16K 37/0083 |
| | | | | 73/1.72 |
| 2008/0121290 | A1* | 5/2008 | Pape | ............. G01N 29/14 |
| | | | | 137/551 |
| 2009/0120515 | A1* | 5/2009 | Ohtani | ............. F16K 5/0407 |
| | | | | 137/553 |
| 2010/0155635 | A1* | 6/2010 | Fima | ............. F16K 37/0075 |
| | | | | 251/129.01 |
| 2013/0186472 | A1* | 7/2013 | Schottler | ............. F17D 3/00 |
| | | | | 137/12 |
| 2014/0345726 | A1* | 11/2014 | Seggio | ............. E03C 1/057 |
| | | | | 137/613 |
| 2015/0040997 | A1* | 2/2015 | Blake | ............. E03C 1/057 |
| | | | | 137/551 |
| 2021/0148477 | A1 | 5/2021 | Canjuga | |

OTHER PUBLICATIONS

Anderson Greenwood Direct Spring Operated Pressure Relief Valves Series 60 and 80 Product Catalog, www.Emerson.com, 2018, 71 pages.

Crosby J-Series Direct Spring Pressure Relief Valves Product Catalog, www.Emerson.com/FinalControl, 2017, 92 pages.

\* cited by examiner

RELATED ART

SENSING ARRANGEMENT FOR VALVES

CROSS-REFERENCE TO RELATED APPLICATIONS

This application claims priority to U.S. Provisional Application No. 63/331,957, filed Apr. 18, 2022, the entirety of which is incorporated herein by reference.

BACKGROUND

Safety relief valves, including spring-operated pressure relief valves, for example, are used extensively in systems and vessels where pressure protection is required. For example, in such systems, excess pressure can lead to a process upset, instrument failure, or equipment failure. Pressure relief valves allow excess pressure to be relieved by allowing pressurized fluid to flow from an auxiliary passage out of the system.

SUMMARY

Generally, embodiments of the invention can provide systems for monitoring health, performance, and operational (e.g., actuation) status of valves. In this regard, embodiments of the invention can also provide monitoring systems to help identify potential failures or deficiencies in components of safety relief valves.

Some embodiments provide a sensing arrangement for a relief valve with a valve body. A formed port in the valve body can be downstream of a valve seat of the relief valve and upstream of an outlet of the valve body, relative to a flow path through the valve body from the valve seat to the outlet. A valve body engagement member can be secured to the valve body at the formed port, in fluid communication with a flow path (e.g., extending through the formed port to intersect or otherwise be exposed to the flow path proximate to the valve seat of the relief valve). A first sensor can be in communication with the flow path via the valve body engagement member to detect a valve event at the valve seat.

Some embodiments provide a blowdown adjustment set screw for a relief valve. The blowdown adjustment set screw can include a screw body, a valve-engaging portion, a mounting portion, and a sensing port. The valve-engaging portion can be disposed at a first end of the screw body and can be configured to engage a blowdown adjustment system (e.g., a nozzle ring or an orifice) of the relief valve to adjust a blowdown of the relief valve. The mounting portion can be disposed at a second end of the screw body opposite the valve-engaging portion and configured to engage (e.g., receive) one or more sensors to place the one or more sensors in communication with flow across a valve seat of the relief valve. The sensing port can extend through the valve body between the valve-engaging portion and the mounting portion. The sensing port can include a first opening at the mounting portion and a second opening at the valve-engaging portion sized to receive pressure signals from the flow corresponding to a valve event at the valve seat.

Some embodiments provide a method of retrofitting a valve body to use a sensing arrangement as disclosed herein. A set screw or a first port connection can be removed from a formed port that is a threaded set screw bore or a port, respectively. A valve body engagement member can be secured at the formed port in place of the set screw or the first port connection to place the first sensor in communication with a flow path through the valve body.

Some embodiments provide a method for sensing a valve event in a relief valve. The relief valve can include a valve body with a valve inlet and a valve outlet. The method can include inserting a valve body engagement member through a formed port in the valve body. The valve body engagement member can include a valve-engaging portion and a sensor mounting portion. The valve-engaging portion can be configured to be disposed adjacent to a valve seat and in a flow pat of the relief valve. In particular, the valve-engaging portion can be configured to be disposed between the valve seat and the valve outlet, and closer to the valve seat than the valve outlet. The sensor mounting portion can be configured to extend outside of the valve body. The method can further include securing one or more sensors to the sensor mounting portion of the valve body engagement member. The method can further include outputting an indication of a valve event when the one or more sensors detect a valve event.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
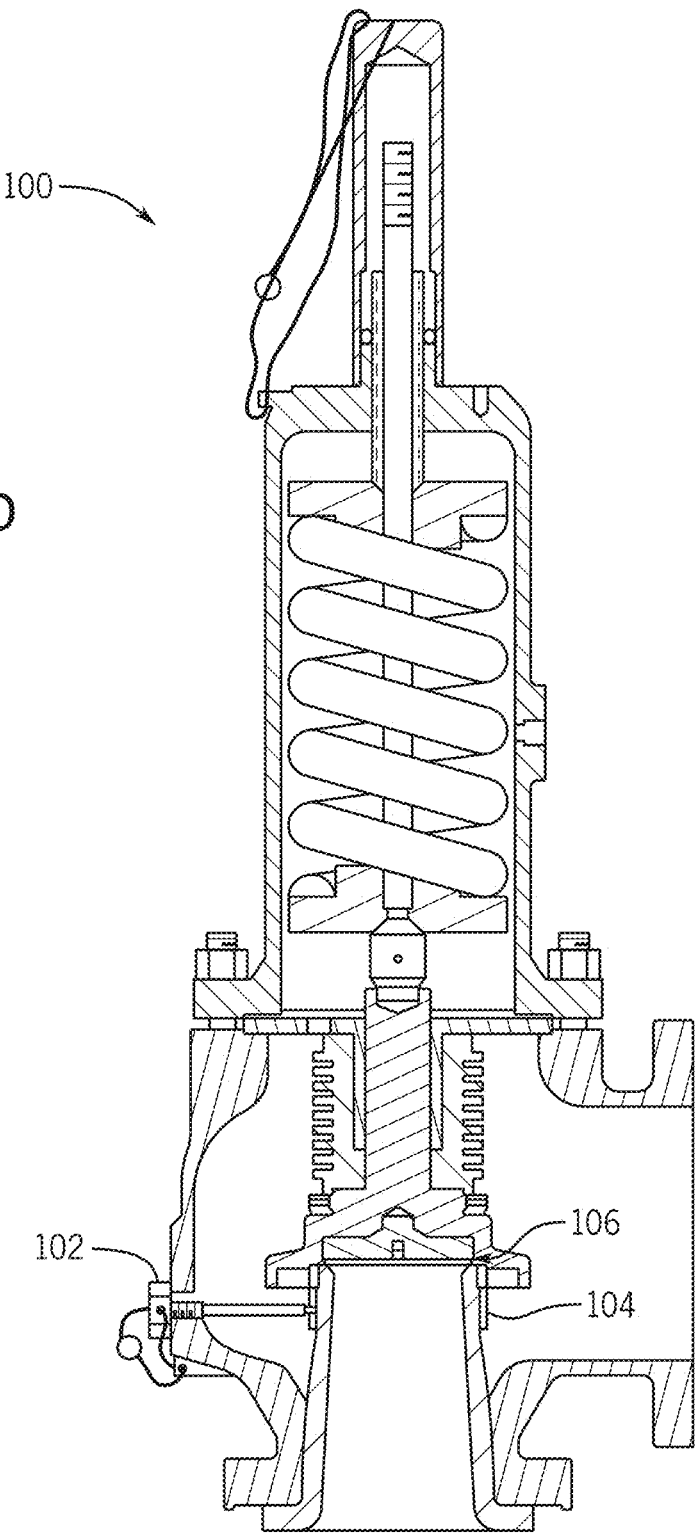
FIG. 1 is a cross-sectional view of a conventional spring-operated pressure relief valve including a blowdown adjustment set screw that can control a position of a nozzle ring.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Unless otherwise specified or limited, the terms "about," "approximately," and "substantially" as used herein with respect to a reference vale refer to variations from the reference value of ±5%, inclusive.

As briefly discussed above, certain systems and vessels require pressure protection to avoid over-pressurization. Relief valves, such as spring-operated pressure relief valves and pilot operated relief valves, for example, can be used in such systems to relieve and divert excess fluid pressure. In general, spring-operated pressure relief valves include a spring that is compressed by a predetermined value. The spring provides a force on a valve disc in a valve-closing direction (e.g., downward), thereby biasing the valve toward a closed position. The compression of the spring can be adjusted via a spring adjustment mechanism, such as an adjustable screw that controls the degree of compression of the spring for a given valve lift. When an opening (e.g., upward) force exerted by a pressurized fluid acting on the valve disc equals the closing (e.g., downward) force of the spring, plus any ancillary forces (e.g., due to the weight of a disc assembly), the valve begins to open. As the fluid pressure continues to increase, the spring is further compressed, and the valve is further opened.

Spring-operated pressure relief valves are generally configured to provide a set pressure, which is typically predetermined and preset before installation of the valves. The set pressure is typically a pressure at which the valve opens and there is a significant relief of system pressure, although other definitions are applied in different installations, as is known in the industry. In some instances, the set pressure may be defined as the pressure at which a first audible response (i.e., "pop") can be heard by a user, as a spring-operated pressure relief valve releases system pressure, or may be defined as the pressure at which leakage through a valve is first audible for human operators. As appropriate, the set pressure for a particular valve can be adjusted by varying the compression of a spring within the valve, including by adjusting a pressure adjustment screw to compress or release a spring by a certain amount.

In addition to a set pressure, spring-operated pressure relief valves further define a crack pressure. The crack pressure is a pressure at which the disc assembly of the valve first begins to lift from the valve seat in response to system pressure. In other words, the crack pressure may be defined as a pressure at which the force of the fluid on a line side of the valve seat equals the force exerted by the spring (and any ancillary forces) on a relief side of the valve seat. The effect of a system reaching crack pressure can be minute fluid leakage or a low decibel audible noise (e.g., such as may not necessarily be audible to human operators).

Repeated fluid leakage, generally near crack pressure of a valve, can be associated with valve simmer. In general, a valve simmer can be defined when there is an audible or visible escape of fluid between the disc and the seat that occurs when the valve opens slightly. While some leakage may occur during a simmering event, in some contexts, valve leakage can be defined as minute passage of fluid from a valve seat that is not associated with valve lift. In general, there can be different thresholds associated with leakage ranging from a few bubbles a minute to continuous flow of fluid. Leakage can be a result of a damaged seating surface, debris within or between the seating surface, or a valve not seating properly after closure.

Spring-operated pressure relief valves can further define a blowdown pressure. The blowdown pressure corresponds to a pressure below the set pressure at which the valve recloses after opening. In some industries, a standard (e.g., required) blowdown pressure for a spring-operated pressure relief valve is greater than 3% below the set pressure. However, different standards and/or requirements for the blowdown pressure are possible. In general, the difference between a closure pressure of a valve and a set pressure is referred to as blowdown pressure. Many relief valves (e.g., direct spring and pilot operated relief valves) have adjustable blowdown capability.

In some cases, when a spring-operated pressure relief valve is at crack pressure, simmering, or is experiencing a leakage unrelated to valve lift, the valve disc may not be fully seated on the valve seat. However, due to the relatively small distances of travel or relatively small pressure changes, conventional measuring and sensing devices and arrangements are often unable to detect such a movement or valve abnormalities until after greater pressure has been applied. For example, some conventional measuring and sensing arrangements can include an acoustic sensing device mounted at an outlet of a valve. Unfortunately, if the leakage is very minute, and because the sensor is typically located far away from the leak point, the sensor may not pick up the leakage due to the dispersion of the acoustic signature of the leak. In general, this can be more prevalent on larger valves where the sensor may be mounted relatively far from the leak point. For example, in conventional designs, acoustic sensors are typically mounted downstream of an outlet of a valve. Further, conventional sensing arrangements often require new valve installation or significant modification to an existing valve, including casting modification or intrusive mechanical components to be attached to a moving member, which can be time consuming and expensive.

For example, conventional sensing arrangements can include devices that monitor valve seat movement by attaching a wired position sensor, a linear variable differential transformer (LVDT), GO switches, limit switches, and proximity sensors. As described above, such arrangements often require intrusive mechanical components to be attached to moving members of a valve, which can present certain challenges, and involve complex valve modifications and addition of seals to retain pressure. Thus, it can be costly and burdensome to equip, maintain, and retrofit valves with such conventional sensing arrangements.

Embodiments of the disclosed invention can address these and other drawbacks associated with conventional valve measuring devices and arrangements. For example, embodiments of the invention provide a sensing arrangement in close proximity to the seating area so that one or more sensing devices can accurately capture valve characteristics associated with the valve and valve seat. In general, close proximity sensing relative to the seating area of a valve can improve the ability to capture an acoustic signature or pressure change associated with a valve event or abnormality close to the point of origin before significant or unwanted dissipation occurs.

In some embodiments, a sensing arrangement can utilize existing access points for a valve body to improve the placement of sensors. As briefly discussed above, for example, direct spring-loaded pressure relief valves can include a blowdown adjustment feature to control the blowdown of the relief device (e.g., formed as a ring, orifice, or other known blowdown adjustment system at or near a valve seat). In some instances, the blowdown adjustment feature can be configured as a blowdown adjustment set screw, a blowdown adjustment bolt, or another screw-like adjustment fastener, that can control the blowdown of the valve. The blowdown may be controlled directly or indirectly. For example, in some implementations, a blowdown adjustment set screw can be rotated to adjust and secure the position of another component, e.g., a nozzle ring or guide ring, that controls the blowdown of the valve via the blowdown adjustment feature.

Thus, some embodiments of the invention can include a sensing arrangement that incorporates a blowdown adjustment set screw and one or more sensing devices. The blowdown adjustment screw can, for example, include one or more pressure ports extending therethrough so that the one or more sensors can be in communication (e.g., fluid, pressure, and/or temperature communication) with the disc assembly or seat of the valve. Other embodiments of the invention can similarly include a sensing arrangement in communication with other ports in the valve body to provide accurate event detection of the valve in relatively close proximity to the event origin (e.g., closer to the valve seat than to the valve outlet). For example, sensing arrangements according to embodiments of the invention can monitor valve leakage, valve simmer, valve opening and closing, valve chatter and flutter, and valve malfunction (e.g., valve stuck open) from a location that is in relatively close proximity to a valve seat. In particular, a sensing end (which can include a sensing pilot hole) of a sensing arrangement may be located approximately between 0.5 inches to 2 inches away from the valve seat.

In some embodiments, sensing devices in communication with a sensing port, such as a pressure port extending through a blowdown adjustment screw, can include an acoustic sensor, a pressure sensor, and/or a temperature sensor. In general, the sensing device of the sensing arrangement according to embodiments of the invention can thus provide an integrated monitoring capability for pressure relief devices. The monitoring capabilities can enable a user to monitor key functional and performance aspects of the relief device, including to anticipate potential failure modes or otherwise identify a need for maintenance or replacement.

As described above, relief valves can include blowdown adjustment features to control the blowdown of the relief valve. In particular, with reference to FIG. 1, a spring-operated pressure relief valve 100 can include a blowdown adjustment mechanism configured as a blowdown adjustment set screw 102. In the illustrated embodiment, the blowdown adjustment set screw 102 can be used to control and secure the position of a nozzle ring 104 relative to a nozzle proximate to a valve seat 106 of the valve 100. In general, the nozzle ring 104 can be configured to reduce valve simmering by restricting flow during initial valve opening movement by acting as an additional orifice. As another example, FIG. 2 illustrates a spring-operated pressure relief valve 120 that can include a blowdown adjustment mechanism configured as a blowdown adjustment bolt 122. The blowdown adjustment bolt 122 can directly control the blowdown of the valve 120 by moving in and out of proximity of a guide hole 124 proximate to a valve seat 126 of the valve 120.

In some embodiments, a valve body engagement member to place a sensor in communication with flow through a valve can be configured to be used with a pre-existing formed (e.g., cast or bored) port in a valve body, including as can allow for installation as part of a retrofit kit for pre-existing valves. Generally, such a valve body engagement member can be secured to such a formed port in a variety of ways, including by being received in (e.g., fully through) the formed port to be in communication with (e.g., extend into) a flow path through the valve body for process fluid.

Figure 2:
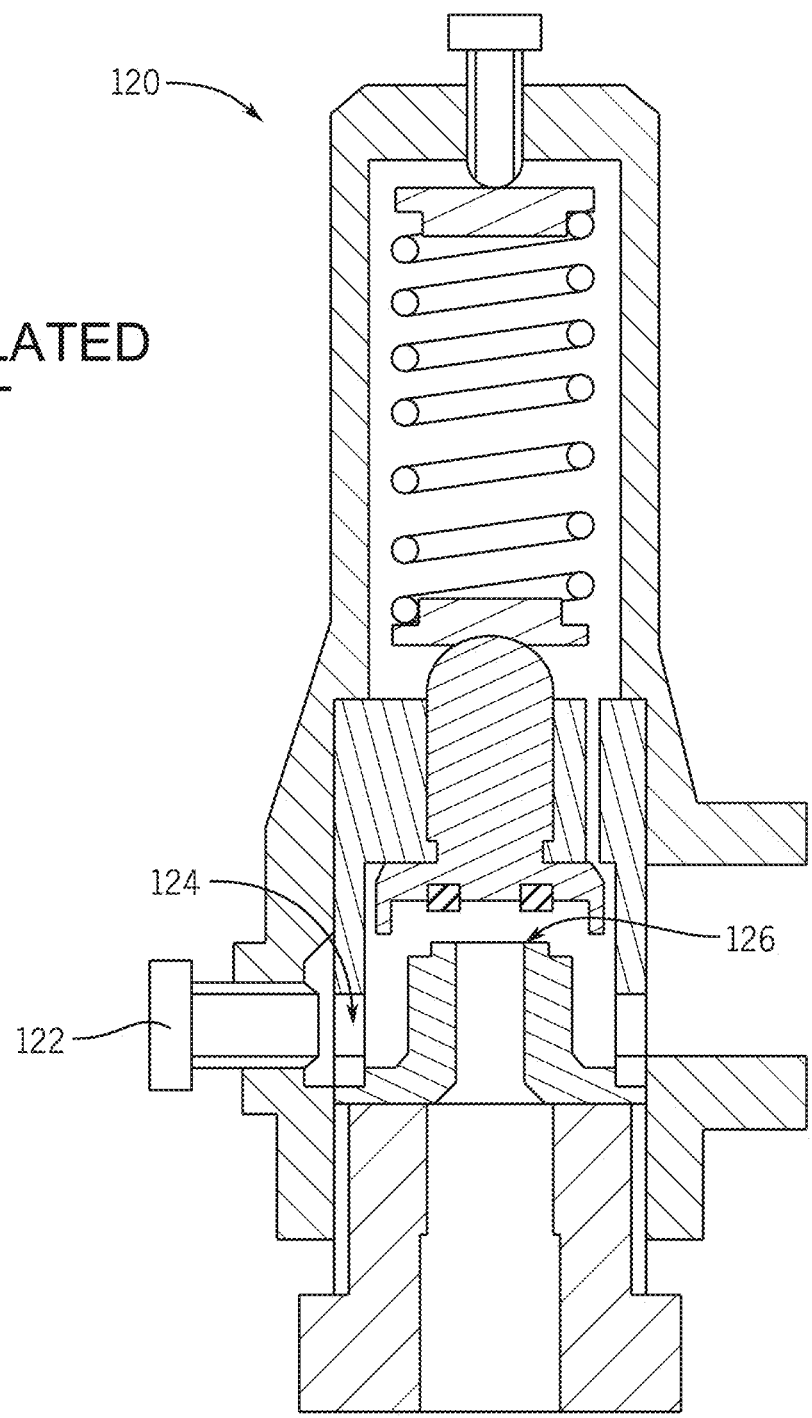
FIG. 2 is a cross-sectional view of a conventional spring-operated pressure relief valve including a blowdown adjustment bolt that can control valve blowdown directly.
Figure 3:
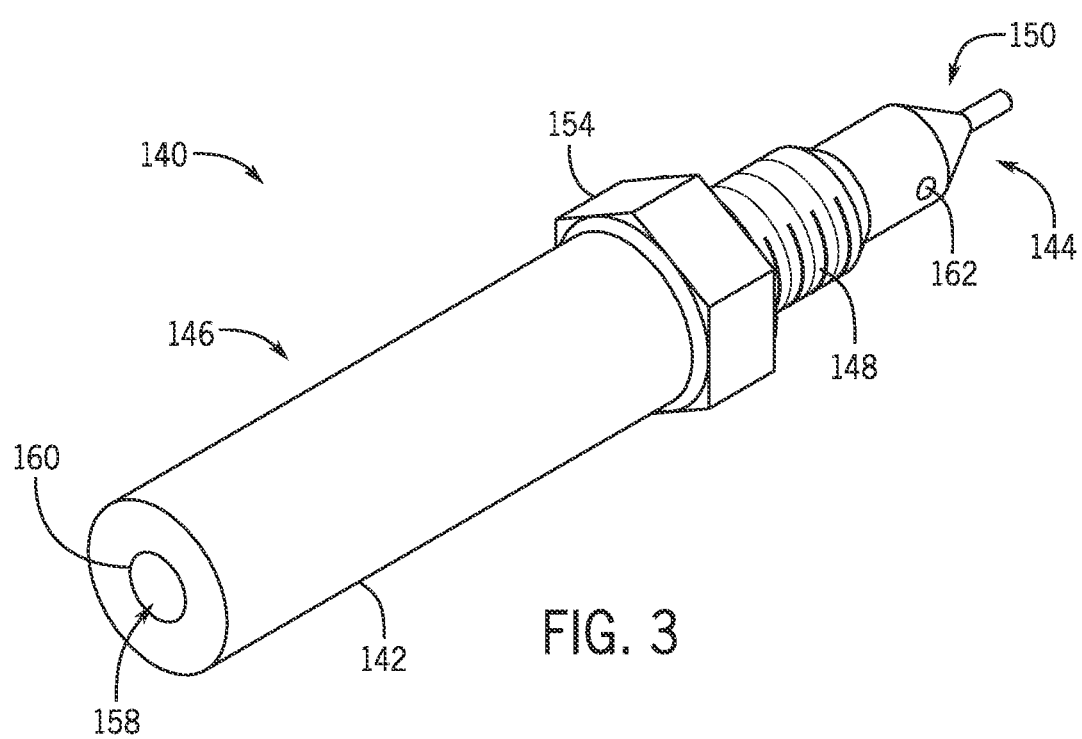
FIG. 3 is an isometric view of a blowdown adjustment screw including a sensing port according to an embodiment of the invention.
Figure 4:
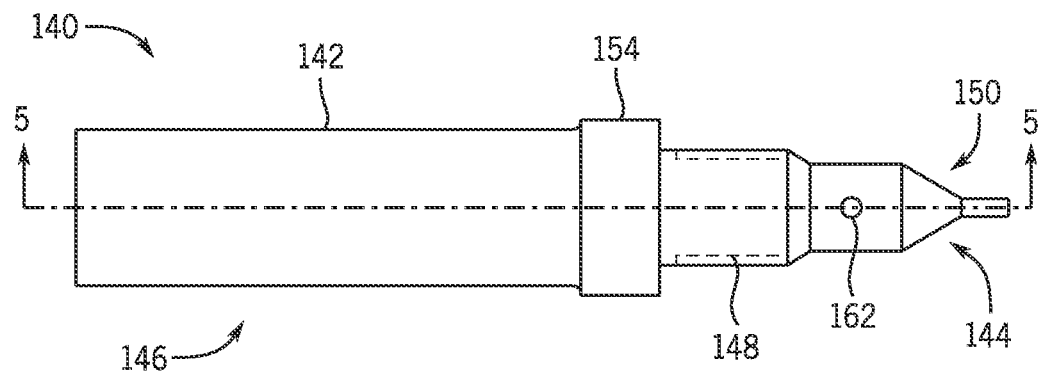
FIG. 4 is a side view of the blowdown adjustment screw of FIG. 3.
Figure 5:
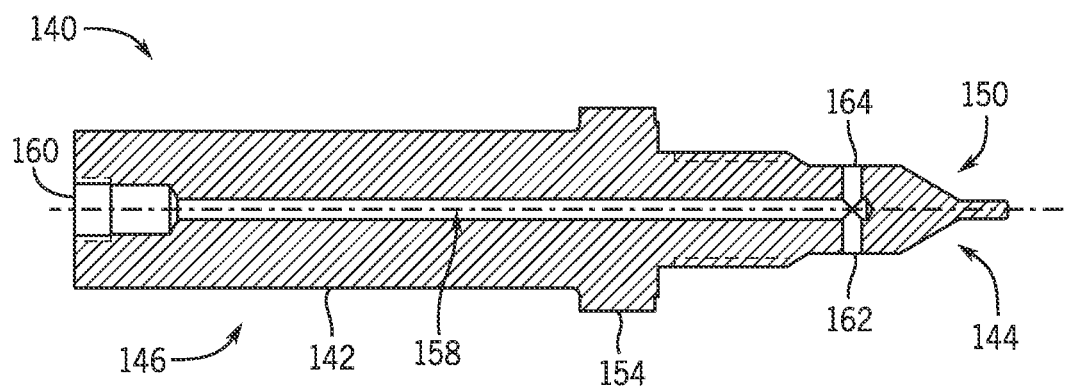
FIG. 5 is a cross-sectional side view of the blowdown adjustment screw of FIG. 3 taken along line A-A of FIG. 4.

Referring now FIGS. 3-5, for example, a valve body engagement member configured as a blowdown adjustment set screw 140 according to an embodiment of the invention is shown. In the illustrated embodiment, the blowdown adjustment set screw 140 includes a body 142 having a valve-engaging portion 144 and a mounting portion 146. The valve-engaging portion 144 can include threads 148 and a locking end 150 configured as an adjustment end. The locking end 150 can be generally configured to adjust the blowdown of a valve, such as, for example, engaging and securing a nozzle ring (e.g., the nozzle ring 104 of FIG. 1) or restricting flow through a guide hole (e.g., the guide hole 124 of FIG. 2). In the illustrated embodiment, the locking end 150 is configured as a tapered protrusion extending from the valve-engaging portion 144; however, other geometries are possible.

The mounting portion 146 can include a mount surface configured to receive one or more sensing devices, such as an acoustic sensor, temperature sensor, and/or pressure sensor, for example. In the illustrated embodiment, a hexagonal head 154, which may generally be configured as a fixed nut, is positioned between the valve-engaging portion 144 and the mounting portion 146. In some embodiments, the hexagonal head 154 can provide a stop so that the blowdown adjustment set screw 140 can only be inserted into a valve body a certain distance. Additionally or alternatively, the hexagonal head 154 can provide a gripping point so that a user can turn the blowdown adjustment screw 140 relative to a valve body to adjust the blowdown of the valve.

Further illustrated in FIGS. 3-5, the blowdown adjustment set screw 140 can include a port 158 extending through the body 142. The port 158 can be configured as a sensor port (e.g., a passageway) that extends between an end of the mounting portion 146 and the valve-engaging portion 144. With reference to FIG. 5, the port 158 extends axially through the body 142 of the blowdown adjustment set screw 140 with a first opening 160 at the end of the mounting portion 146 and second and third openings 162, 164 on lateral sides of the valve-engaging portion 144. In the illustrated embodiment, the second and third openings 162, 164 are located between the threads 148 and the locking end 150 so that the second and third openings 162, 164 are in communication with a valve seat and configured to transmit certain characteristics of the valve seat (e.g., temperature, acoustics, and pressure) via the port 158.

In the illustrated embodiment, the port 158 includes first, second, and third openings 160, 162, 164; however, fewer or more openings are possible to communicate temperature and pressure between the valve seat and an exterior of the valve body. In some embodiments, the first and second openings 162, 164 can reduce (e.g., negate) a Venturi effect that may exist during a valve event when fluid flows through a constricted section (e.g., a single opening in the valve-engaging portion of a set screw) causing a reduction in pressure. Thus, the first and second openings 162, 164 can help prevent an unwanted vacuum from forming in the port 158. In other embodiments, fewer openings may be used in conjunction with an intentional positioning of such openings to intentionally create a localized low-pressure region during a valve event, which can be used in the detection or determination of certain valve events. In other embodiments, one or more sub-openings can be formed at or near the valve-engaging portion 144 to collectively negate a Venturi effect.

In some embodiments, the valve-engaging portion 144 of the blowdown adjustment set screw 140 can have similar dimensions to an existing set screw for a relief valve, such as the blowdown adjustment set screw 102 of FIG. 1, for example, so that existing set screws may be replaced (i.e., retrofitted) with a blowdown set screw according to embodiments of the invention (i.e., the blowdown set screw 140).

Figure 6:
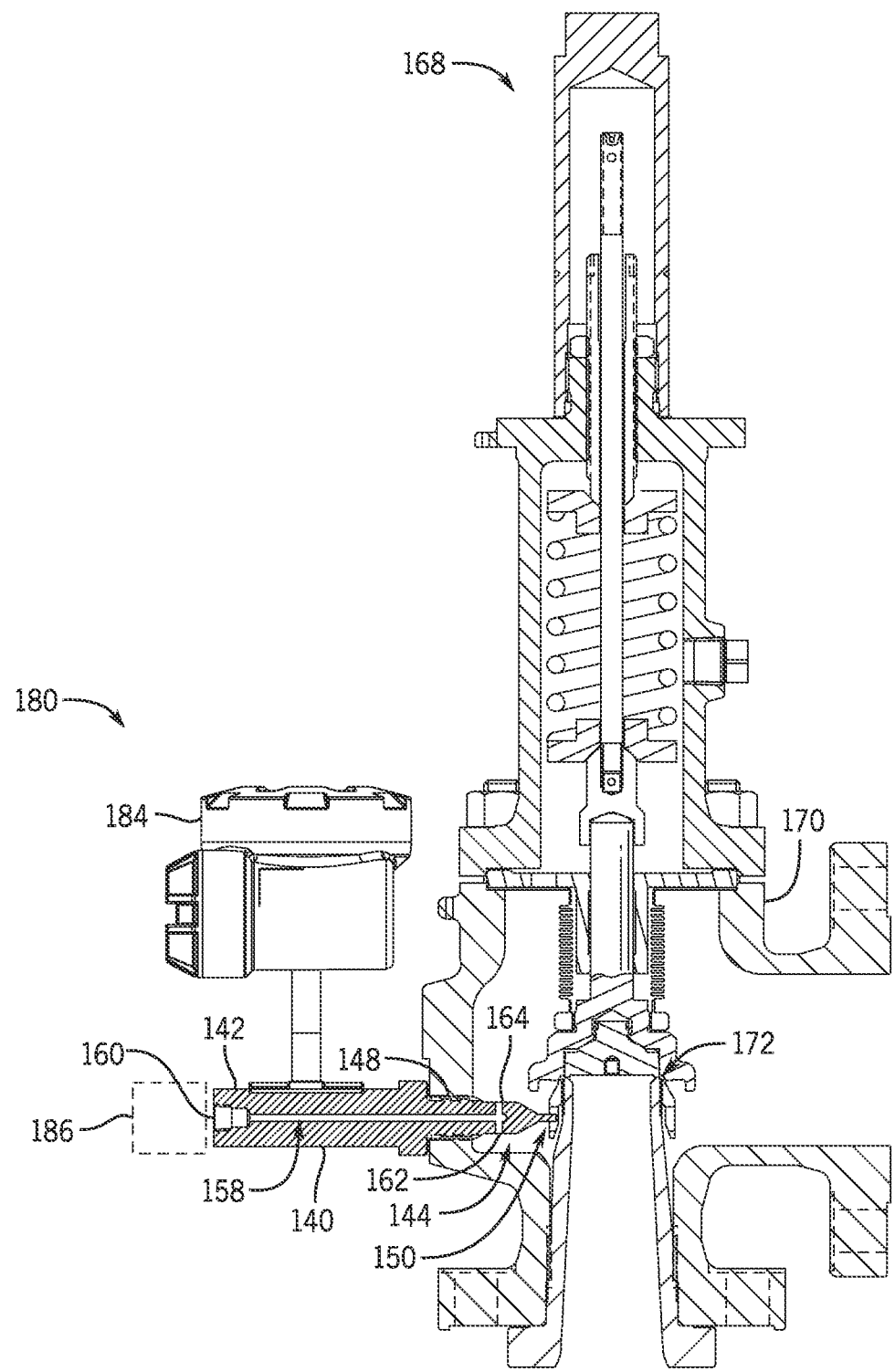
FIG. 6 is a cross-sectional view of a spring-operated pressure relief valve equipped with the blowdown adjustment screw of FIG. 3 according to an embodiment of the invention.

With reference to FIG. 6, as described above, the blowdown adjustment set screw 140 can be used with an existing relief valve 168 having a valve body 170 and a valve seat 172 to provide a sensing arrangement 180. In use, for example, the valve engaging portion 144 of the blowdown adjustment set screw 140 can be inserted into a blowdown adjustment port of the relief valve 168 and the locking end 150 of the blowdown adjustment set screw 140 can be used to adjust the blowdown of the relief valve 168 (e.g., by rotation relative to threads in the blowdown adjustment port). In the illustrated example, the threads 148 of the blowdown adjustment set screw 140 can be used to secure the body 142 relative to the valve body 170, although other approaches are possible.

When the blowdown adjustment set screw 140 is secured to the valve body 170, the set screw 140 can thus provide fluid communication between a flow path through the valve body 170 and the port 158, as can allow sensors attached to or in fluid communication with the set screw 140 to detect signals indicative of certain flow events in the valve body 170. For example, as illustrated, the second and third openings 162, 164 of the port 158 are disposed in close proximity to (e.g., 0.5 inches to 2 inches from) the valve seat 172 and the first opening 160 of the port 158 is disposed outside of the valve body 170, so that pressure signals from near the valve seat 172 (e.g., immediately downstream of the valve seat 172) can be transmitted into the port 158 to be detectable by one or more sensors.

In some embodiments, as illustrated in FIG. 6, the sensing arrangement 180 can include a first sensor 184. The first sensor 184 can be secured to the mounting portion 146 of the blowdown adjustment set screw 140. The first sensor 184 can be an acoustic sensor. In general, an acoustic sensor can rely on the modulation of surface acoustic waves to sense a physical phenomenon, such as, for example, valve leakage and simmer, valve opening and approximate estimate of total capacity of fluid through the valve during an actuation event, valve closing, valve chatter or flutter (e.g., a valve opening and closing rapidly), and a valve stuck open (e.g., due to galling). In this regard, the proximity of the first sensor 184 to the valve seat 172 can advantageously be used to detect events that can be sensed by an acoustic sensor before such events may be detected by acoustic or other sensors disposed farther away from the valve seat 172, such as at the inlet, the bonnet, or downstream near the outlet, for example.

Still referring to FIG. 6, the sensing arrangement 180 can additionally or alternatively include a plurality of sensors. For example, a second sensor 186 can be secured at or near the mounting portion 146 of the blowdown adjustment set screw 140. In particular, the second sensor 186 can be in communication with the port 158 via the first opening 160. In some embodiments, the second sensor 186 may be configured as a pressure sensor so that that second sensor 186 is in pressure communication with the port 158, and thus, the valve seat 172. In general, a pressure sensor can be used to measure fluid pressure and can also be used to indirectly measure other variables including fluid flow. In this regard, the proximity of the second sensor 186 to the valve seat 172 can be used to detect events, such as valve leakage and simmer, valve opening and total capacity relieved during an actuation event, valve closing, valve chatter or flutter, or a valve stuck open. Further, because they are placed in communication with the valve flow by the set screw 140, the second sensor 186 or the first sensor 184 may advantageously detect relevant events before pressure or other sensors that are disposed farther away from the valve seat 172 can.

In other embodiments, the second sensor 186 may be configured as a temperature sensor so that the second sensor 186 is in temperature communication with the port 158, and thus, the valve seat 172. In general, a temperature sensor can sense the temperature of a material (e.g., fluid) and can include a variety of sensing mechanisms, such as thermocouples, resistance temperature detectors, thermistors, and semiconductor based integrated circuits, for example. In general, a temperature sensor can be used to detect valve leakage, valve opening and approximate estimate of total capacity relieved during an actuation event, and valve closing. In particular, when the valve disc is separated from the valve seat, flowing fluid may exhibit the Joule-Thomson effect, which may create a measurable temperature decrease that is indicative of a valve event.

In some embodiments, the sensing arrangement 180 can include a controller and monitoring capabilities. The controller can be configured to output an indication (e.g., an alarm) when the valve experiences one or more valve events. For example, if the sensing arrangement 180 senses a valve crack event, it can provide a crack indication. Relatedly, if the sensing arrangement 180 senses a crack pressure outside of a predetermined or expected threshold, the controller can provide an alarm. An alarm can indicate a valve defect, such as a worn valve seat or ruptured bellows, for example. The monitoring capabilities can enable a user to monitor key functional and performance aspects of the relief device, including to anticipate potential failure modes or otherwise identify a need for maintenance or replacement. The monitoring capabilities can also provide a valve event history over the operational lifetime of the valve.

Figure 7:
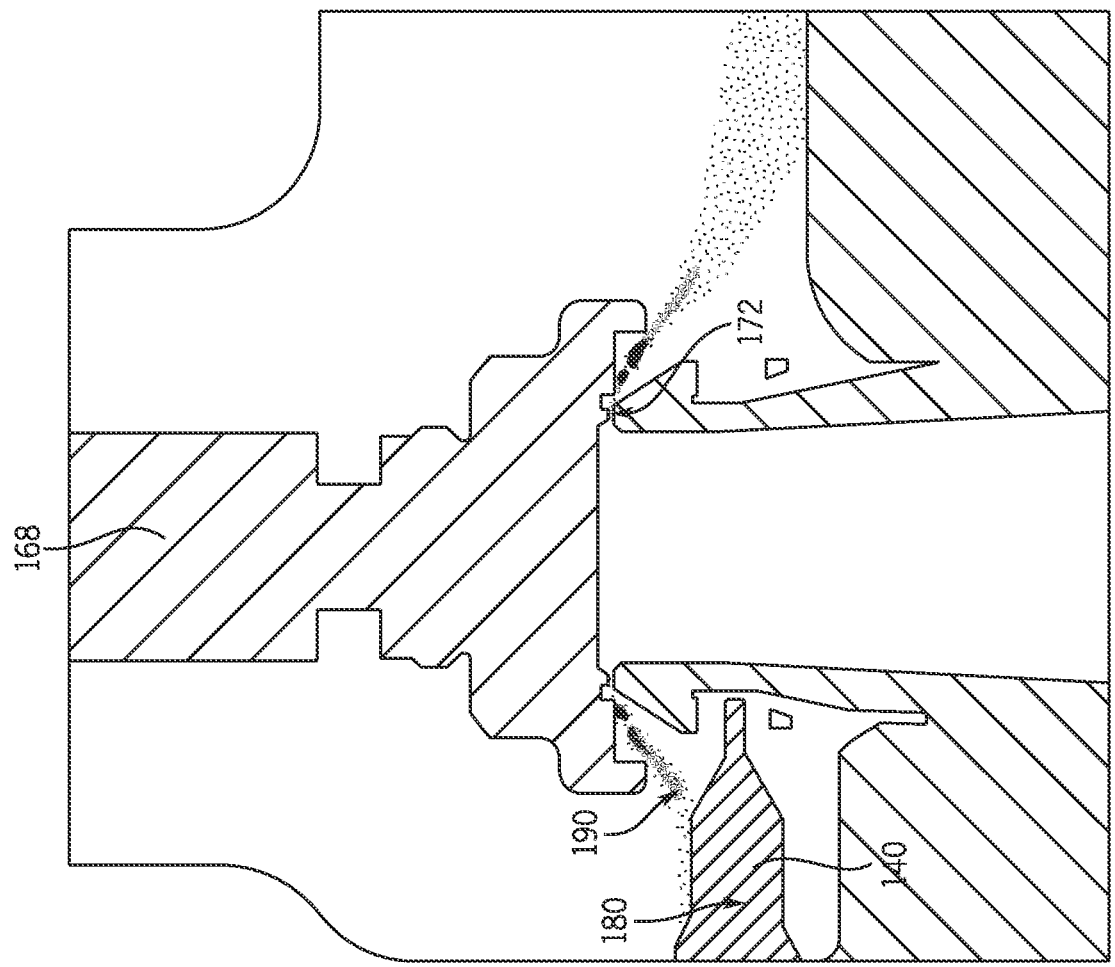
FIG. 7 is a fluid dynamics model of a spring-operated pressure relief valve showing flow stagnation near a blowdown adjustment set screw.

FIG. 7 illustrates an exemplary computational fluid dynamics simulation of a velocity profile generated during a relief event of the relief valve 168. As shown, the area 190 close to the blowdown adjustment set screw 140 shows stagnation of velocity which causes a localized pressure increase adjacent to the valve seat 172. For similar reasons as noted above, The localized pressure increase, as can be a result of a relevant valve event (e.g., valve opening, closing, simmering, etc.), can be successfully detected by the sensing arrangement 180 before such event is reliably detectable further upstream or downstream of the valve seat 172. In particular, as represented in FIG. 7, the proximity of the sensing arrangement 180 to the valve seat 172 can advantageously allow the first sensor 184 or the second sensor 186 to sense a valve event based on the stagnation of velocity near the valve seat 172, particularly when employed in combination with a valve body engagement member configured generally similarly to the set screw 140.

Figure 8:
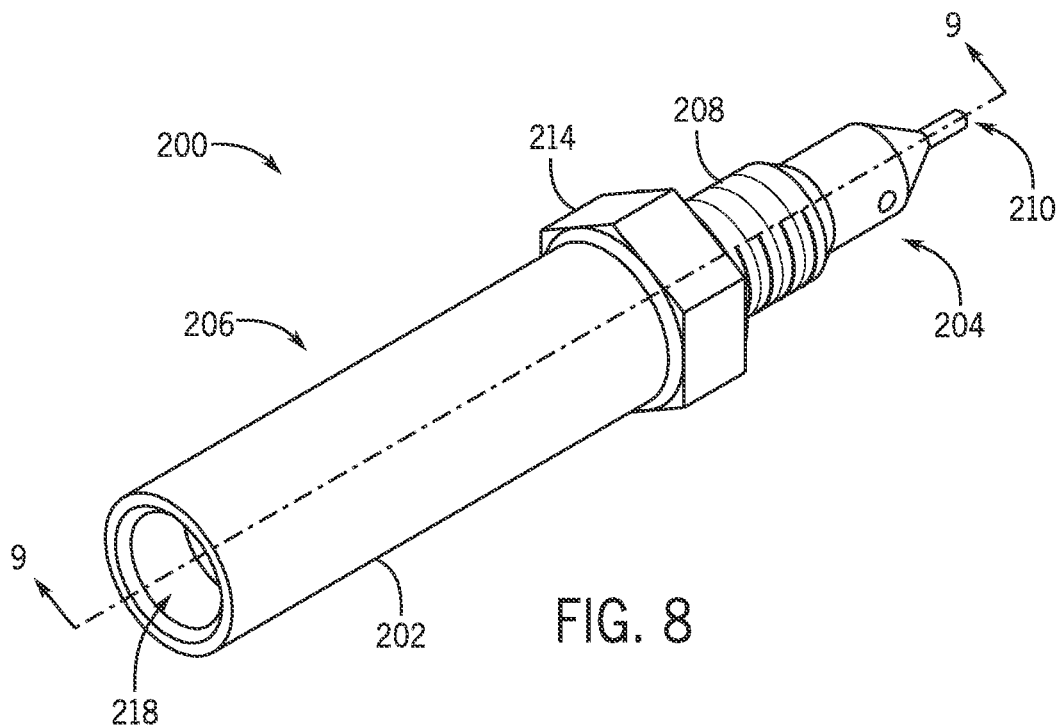
FIG. 8 is an isometric view of a hollow blowdown adjustment screw according to an embodiment of the invention.
Figure 9:
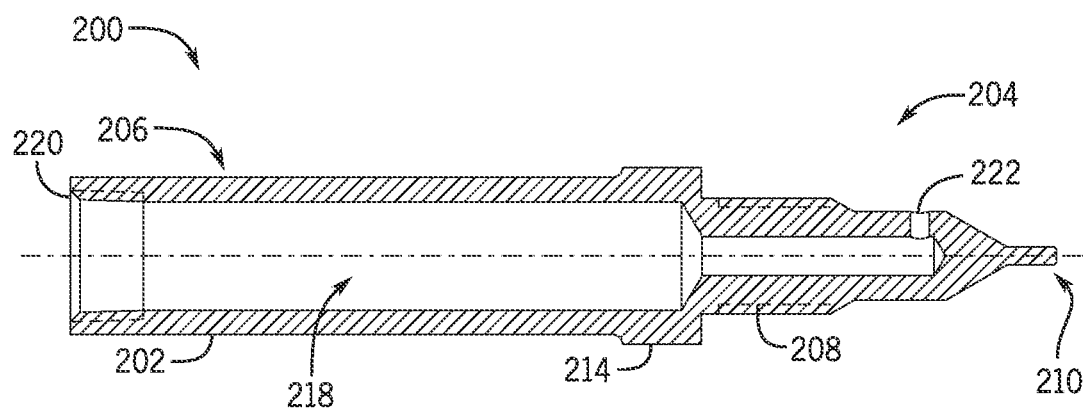
FIG. 9 is a cross-sectional side view of the hollow blowdown adjustment screw taken along line B-B of FIG. 8.

FIGS. 8 and 9 illustrate another blowdown adjustment screw configured as a hollow set screw 200 according to an embodiment of the invention. Similar to the blowdown adjustment set screw 140, the hollow set screw 200 includes a body 202 having a valve-engaging portion 204 and a mounting portion 206. The valve-engaging portion 204 can include threads 208 and an adjustment or locking end 210. Like the blowdown adjustment set screw 140, the locking end 210 of the hollow set screw 200 can be adapted to adjust the blowdown of a valve, such as, for example, by engaging and securing a nozzle ring (e.g., the nozzle ring 104 of FIG. 1) or restricting flow through a guide hole (e.g., the guide hole 124 of FIG. 2).

The mounting portion 206 can include a mount surface configured to receive one or more sensing devices, such as an acoustic sensor, temperature sensor, or pressure sensor, for example. In the illustrated embodiment, a hexagonal head 214 is positioned between the valve-engaging portion 204 and the mounting portion 206. The hexagonal head 214 can provide a stop so that the hollow set screw 200 can only be inserted into a valve body a certain distance. Additionally or alternatively, the hexagonal head 214 can provide a gripping point so that a user can turn the hollow set screw 200 relative to a valve body to adjust the blowdown of the valve.

In some embodiments, the hexagonal head 214 can include a marking or other alignment feature that can be used to rotationally align a port or opening of the hollow set screw 200 relative to a nozzle or valve seat of a valve. For example, the hexagonal head 214 can include a marking or other alignment feature, that when facing upward, corresponds to an opening (e.g., opening 222) also facing upward. This relative alignment may be used to advantageously rotationally position a sensing port of the hollow set screw 200 in an orientation that is adapted to best sense a valve event when the hollow set screw 200 is installed on a valve. Such alignment feature may additionally or alternatively be disposed on the body 202 of the hollow set screw 200.

Further illustrated in FIGS. 8 and 9, the hollow set screw 200 can include a port configured as a chamber 218 extending through the inside of the body 202. The chamber 218 can be configured as a sensor port (e.g., a passageway) that extends between an end of the mounting portion 206 and the valve-engaging portion 204. With reference to FIG. 9, the chamber 218 extends axially through the body 202 of the hollow set screw 200 with a first opening 220 at the end of the mounting portion 206 and a second opening 222 on a lateral side of the valve-engaging portion 204. The second opening 222 is located between the threads 208 and the locking end 210 so that the second opening 222 would be in communication with a valve seat and configured to transmit certain characteristics of the valve seat (e.g., acoustic waves, temperature, and pressure) via the chamber 218.

In some embodiments, the valve-engaging portion 204 of the hollow set screw 200 can have similar dimensions to an existing set screw for a relief valve, such as the blowdown adjustment set screw 102 of FIG. 1, for example, so that an existing set screw may be replaced (i.e., retrofitted) with a blowdown adjustment screw according to embodiments of the invention. Like the blowdown adjustment set screw 140, the hollow set screw 200 can be used with a relief valve, such as the relief valve 168, to provide a sensing arrangement. In use, for example, the valve-engaging portion 204 of the hollow set screw 200 can be inserted into a blowdown adjustment port of a relief valve and the locking end 210 of the hollow set screw 200 can be used to lock or adjust the blowdown of the relief valve.

When the hollow set screw 200 is secured to a valve body, the hollow set screw 200 can provide fluid and acoustic communication between a flow through the valve body and the chamber 218. Sensors can be attached or in fluid communication with the hollow set screw 200 to detect signals indicative of certain flow events in the valve body. In general, the chamber can provide an acoustic chamber where sound waves indicative of a valve event are amplified, and thus detected ahead of other conventional sensor configurations. In some embodiments, a combination of one or more of acoustic sensors, temperature sensors, and pressure sensors can be used to detect valve events. In particular, the combination may be able to detect certain valve events ahead of (and more consistently than) conventional sensor configurations, including single-sensor configurations.

Like the blowdown adjustment set screw 140, the hollow set screw 200 can allow one or more sensors to be secured to the body 202 of the hollow set screw 200, such as at the mounting portion 206. In the illustrated embodiment, the body 202 can be sufficiently hollow so that the side wall is as thin as is mechanically and structurally allowable. For example, in the illustrated embodiment, the diameter of the hollow set screw 200 at the mounting portion 206 is approximately 1.0 inches and the diameter of the chamber 218 is approximately 0.69 inches. Thus, in some embodiments, a hollow set screw can include a chamber having a diameter that is between approximately 50% and 90% of the screw body diameter, or a chamber having a diameter that is between approximately 65% and 75% of the screw body diameter.

Figure 10:
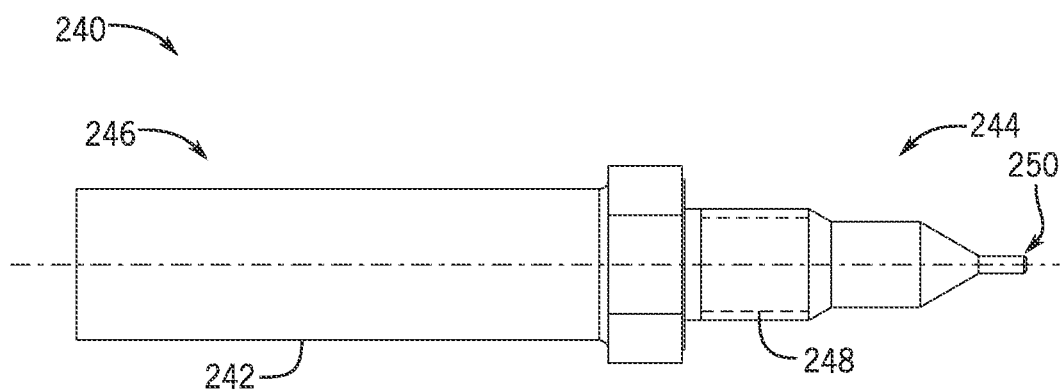
FIG. 10 is a side view of a solid blowdown adjustment screw according to an embodiment of the invention.

Referring now to FIG. 10, another blowdown adjustment set screw configured as a solid set screw 240 is shown. Similar to the screws described above, the solid set screw 240 includes a body 242 having a valve-engaging portion 244 and a mounting portion 246. The valve-engaging portion 244 can include threads 248 and a locking end 250. The solid set screw 240 can be adapted to adjust the blowdown of a valve, such as, for example, engaging and securing a nozzle ring or restricting flow through a guide hole. Unlike the blowdown adjustment set screw 140 and the hollow set screw 200, the solid set screw 240 does not include a sensing port or chamber within the body 242.

The mounting portion 246 can include a mount surface configured to receive one or more sensing devices, such as an acoustic sensor, for example. In some embodiments, a sensing arrangement that includes a solid set screw, such as the solid set screw 240, can provide earlier and consistently reliable valve event detection compared to conventional sensing arrangements. Similar to the set screws described above, an acoustic sensor can be mounted to the mounting portion 246 of the solid set screw 240. The solid body 242 can transmit sound waves detected during a valve event to the acoustic sensor, which can audibly or electronically provide an indication of the valve event to an external receiver.

In some embodiments, the body 242 of the solid set screw 240 (or bodies of the other set screws described herein) can include a plurality of body segments. The body segments can be coupled together to form the body 242. For example, the mounting portion 246 may form a first body segment and the valve-engaging portion 244 may form a second body segment. The first and second body segments can be coupled together via one or more of a press-fit, set screw, lock pin, or adhesive, for example.

During an assembly of a multi-bodied set screw, a first body segment may be rotationally oriented relative to a second body portion so that features in one or both of the body segments can be rotationally aligned. For example, a sensing hole or opening (e.g., the openings 162 and 164 of the blowdown adjustment screw 140 or the opening 222 of the set screw 200) in a second body portion may be rotationally aligned with a mount feature or other marking of a first body portion so that the position of the sensing hole is deliberately known when the set screw is installed on a valve body.

In some embodiments, the size (e.g., length) of a set screw may exceed certain manufacturing capabilities, thus, it may be advantageous to manufacture a plurality of body segments that can be secured together to form the appropriately sized set screw. Additionally, in some instances, certain valves may require specifically dimensioned locking or adjustment ends of a blowdown set screw. Thus, via the multi-body segment configuration of a set screw, a plurality of set screws dimensioned to fit a plurality of different sized valves can be assembled using a first common body segment coupled to a specifically dimensioned second body segment.

Figure 11:
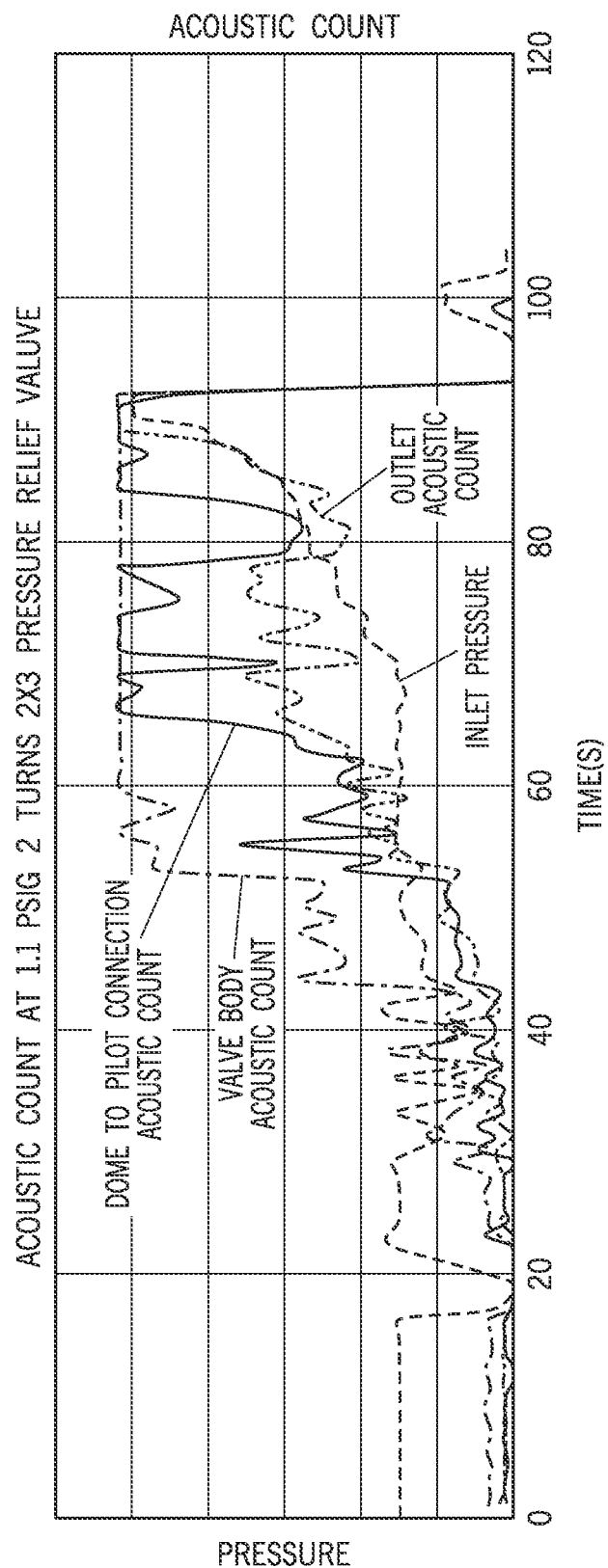
FIG. 11 is a graph illustrating pressure sensed at various locations of a pressure relief valve over time according to one embodiment of the invention.
Figure 12:
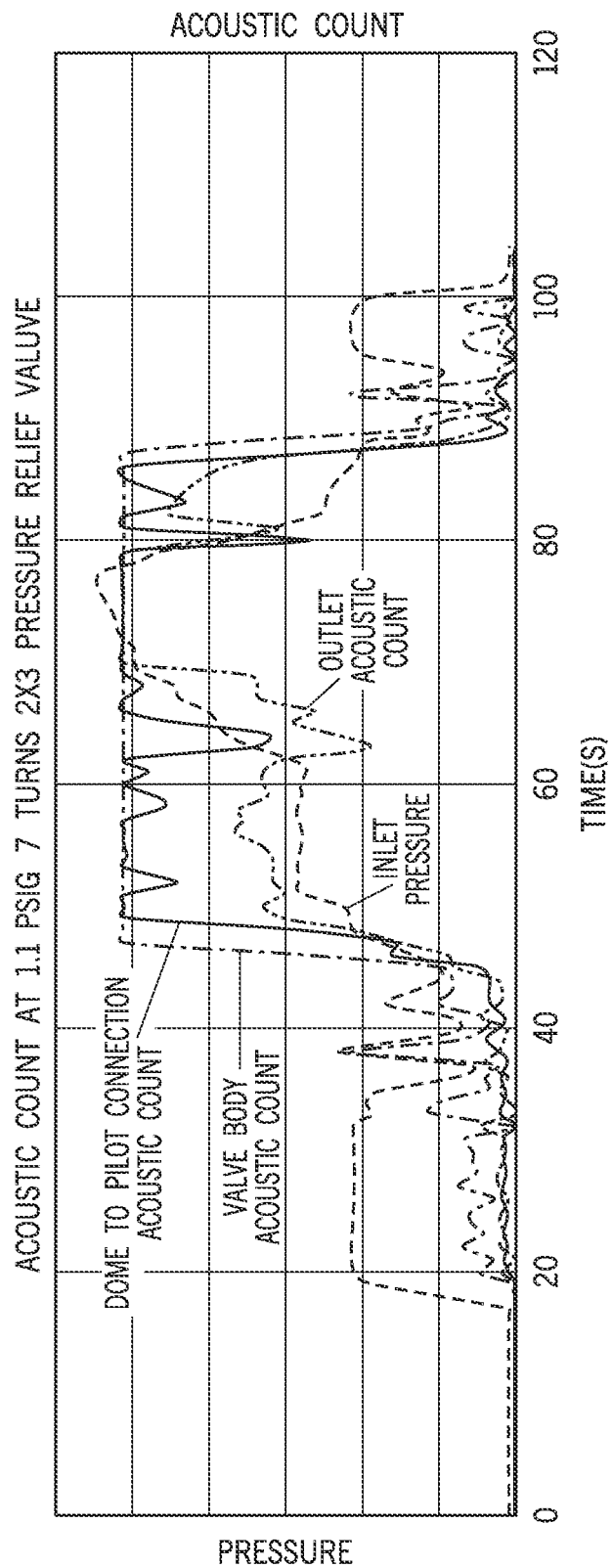
FIG. 12 is a graph illustrating pressure sensed at various locations of a pressure relief valve over time according to another embodiment of the invention.

FIGS. 11 and 12 are graphs that illustrate pressure sensed at various locations of a safety relief valve over time. In the illustrated embodiments, data was collected from a pilot operated pressure relief valve, although similar results may also be obtained for spring operated pressure relief valves. The sensing locations include within a valve body of the valve, at a dome-to-pilot connection, at an inlet of the valve, and at an outlet of the valve. As shown, in general, the stability of data collected at the inlet, the outlet, and the dome-to-pilot connection vary over time and include continuous variations in pressure as well as various lags relative to actual valve operation. In contrast, the data collected at the valve body may be relatively more stable (e.g., and thus more reliable) during any particular valve event (e.g. at approximately 60 seconds in FIG. 11 and at approximately 50 seconds in FIG. 12).

In general, mounting a sensing arrangement in close proximity to a valve seat can circumvent both upstream and downstream noise that may be picked up in other sensing arrangements that are located closer to a valve inlet or a valve outlet than the valve seat. Furthermore, in some embodiments, sensing ports formed in a valve body and in communication with a sensing arrangement can include gaskets or other noise absorbing elements to reduce acoustic noise in the valve or flow system. For example, acoustic noise can be generated by one or more valves, pumps, actuators, or fluid flow. Further, acoustic noise can be propagated through fluid and valve material (e.g., metal). Thus, by reducing acoustic noise and disposing a sensing arrangement proximate (e.g. in an upstream or downstream position) of the valve seat, the valve sensing arrangement can provide reliable valve event detection and sensing capabilities.

In some embodiments, the data collected at the valve body shown in FIGS. 11 and 12 may be collected via a sensing arrangement such as the sensing arrangement 180 described above. In particular, the data collected at the valve body may be collected via one or more sensors positioned in close proximity to a valve seat of the safety relief valve configured to sense a localized pressure increase at the valve seat and generally within the valve body (e.g., along a flow path of the valve body, downstream of a valve seat and upstream of a valve outlet). Thus, for example, some embodiments can be used to monitor valve operation more effectively and reliably (e.g., as shown for the valve body traces in FIGS. 11 and 12), including as may allow operators or automated control systems to identify valve simmer or other leakage events.

Figure 13:
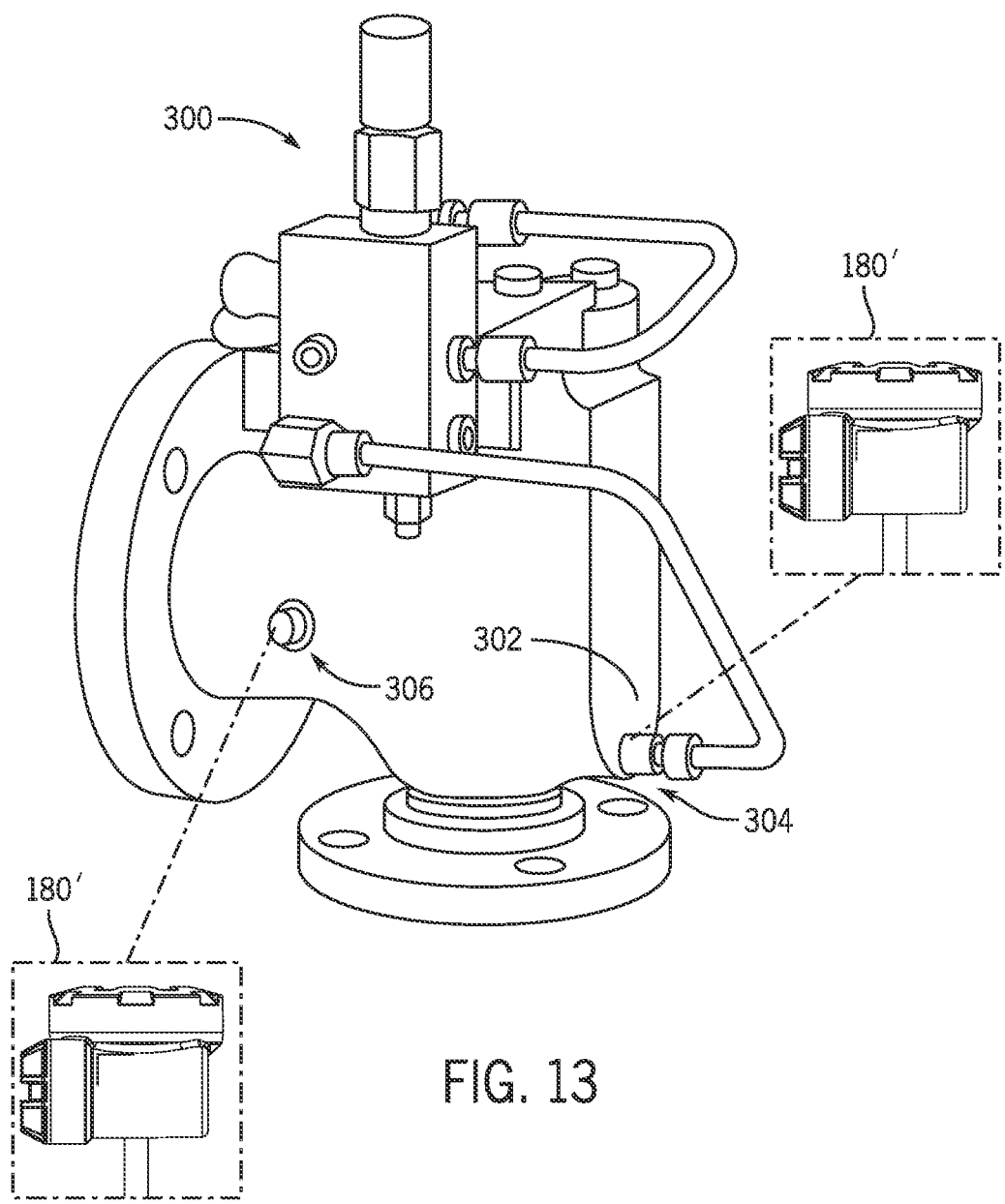
FIG. 13 is an isometric and partly schematic view of a pilot operated relief valve equipped with a sensor according to an embodiment of the invention.

As also generally noted above, different embodiments of the disclosed technology can be implemented on different types of valves, including on spring operated and pilot operated relief valves. FIG. 13 illustrates a pilot-operated pressure relief valve 300 equipped with one or more sensing arrangements 180' according to another embodiment of the invention. In some embodiments, the sensing arrangement 180' may be substantially similar (e.g., include the same or similar sensing components) to the sensing arrangement 180 as described above. As shown, the sensing arrangement 180' can be mounted at a valve body 302 of the pilot-operated pressure relief valve 300 at an integral sense port 304. In the illustrated embodiment, the integral sense port 304 provides a variety of mounting options for an acoustic sensor of the sensing arrangement 180' and provides a wave guide to transmit an acoustic signature. As described above with reference to the relief valve 168 shown in FIG. 6, the sensing arrangement 180' can advantageously allow valve event monitoring proximate to a valve seat of the pilot-operated pressure relief valve 300.

In other embodiments, other ports can be similarly employed to place a sensor in communication with a flow path, including ports with multiple port connections (e.g., as part of a multi-branch manifold or fitting). For example, as also shown in FIG. 13, an additional or alternative sensing arrangement 180' can be disposed an exhaust port or other port 306 formed in the valve 300. As described above, the sensing arrangement can advantageously allow valve event monitoring proximate to a valve seat of the pilot-operated pressure relief valve 300. In some examples, a sensing arrangement according to embodiments of the disclosure (e.g., the sensing arrangements 180, 180') may be mounted on a valve body at a location that is closer than approximately 90% or 95% locations of the valve body to the valve seat.

Thus, embodiments of the disclosed invention can provide an improvement over conventional arrangements for setting a set pressure of a spring-operated relief valve, detecting crack or set pressure of the valve, or otherwise monitoring the valve during operation. The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A sensing arrangement for a relief valve having a valve body, the sensing arrangement comprising:
   a formed port in the valve body downstream of a valve seat of the relief valve and upstream of an outlet of the valve body, relative to a flow path through the valve body from the valve seat to the outlet;
   a valve body engagement member configured as a blowdown adjustment set screw configured to adjust a blowdown pressure of the relief valve and secured to the valve body at the formed port, in fluid communication with the flow path through the formed port; and
   a first sensor in fluid communication with the flow path through the valve body engagement member to detect a valve event at the valve seat.

2. The sensing arrangement of claim 1, wherein the valve body engagement member extends through the formed port into the flow path.

3. The sensing arrangement of claim 1, wherein the blowdown adjustment set screw includes a body extending between a valve-engaging portion and a mounting portion, the mounting portion dimensioned to receive the first sensor.

4. The sensing arrangement of claim 3, wherein a sensing port extends through the body of the blowdown adjustment set screw between the valve-engaging portion and the mounting portion, the sensing port in fluid communication with the flow path.

5. The sensing arrangement of claim 4, wherein the sensing port includes a first opening at the mounting portion and a second opening at the valve-engaging portion, the second opening collectively including a plurality of sub-openings.

6. The sensing arrangement of claim 3, wherein the body of the blowdown adjustment set screw is a solid body configured to transmit an acoustic profile of the valve event to the first sensor configured as an acoustic sensor.

7. The sensing arrangement of claim 1, wherein the first sensor is an acoustic sensor.

8. The sensing arrangement of claim 1, wherein the first sensor is one of a plurality of sensors in communication with the flow path via the valve body engagement member.

9. The sensing arrangement of claim 8, wherein the plurality of sensors includes one or more of a temperature sensor or a pressure sensor in communication with the valve seat, via a sensing port extending through the valve body engagement member.

10. The sensing arrangement of claim 1, wherein the first sensor includes a controller to output an indication of the valve event.

11. The sensing arrangement of claim 1, further comprising:
    a second formed port in the valve body downstream of an inlet of the valve body and upstream of the valve seat of the relief valve, relative to a flow path through the valve body from the inlet to the valve seat;
    a second valve body engagement member secured to the valve body at the second formed port, in fluid communication with the flow path through the formed port; and
    a second sensor in communication with the flow path via the second valve body engagement member to detect the valve event at the valve seat.

12. The sensing arrangement of claim 1, wherein the sensing arrangement is configured as a retrofit kit for the relief valve.

13. A blowdown adjustment set screw for a relief valve, the blowdown adjustment set screw comprising:
    a screw body;
    a valve-engaging portion disposed at a first end of the screw body and configured to engage a blowdown adjustment system of the relief valve to adjust a blowdown of the relief valve;
    a mounting portion disposed at a second end of the screw body opposite the valve-engaging portion and configured to engage one or more sensors to place the one or more sensors in communication with flow across a valve seat of the relief valve; and
    a sensing port extending through the screw body between the valve-engaging portion and the mounting portion, the sensing port including a first opening at the mounting portion and a second opening at the valve-engaging portion sized to receive pressure signals from the flow corresponding to a valve event at the valve seat.

14. The blowdown adjustment set screw of claim 13, wherein the mounting portion of the blowdown adjustment set screw is configured to secure an acoustic sensor to sense a valve event at the valve seat.

15. The blowdown adjustment set screw of claim 13, wherein the sensing port includes a third opening at the valve-engaging portion.

16. The blowdown adjustment set screw of claim 13, wherein the valve-engaging portion is configured to be disposed closer to the valve seat of the relief valve than an outlet of the relief valve.

17. The blowdown adjustment set screw of claim 13, wherein a portion of the sensing port that extends through the mounting portion defines a diameter that is greater than a wall thickness of the screw body in a radial direction at the mounting portion.

18. A method for sensing a valve event in a relief valve, the relief valve having a valve body with a valve inlet and a valve outlet, the method comprising:
inserting a blowdown adjustment set screw, configured to adjust a blowdown pressure of the relief valve, through a formed port in the valve body so that a valve-engaging portion of the blowdown adjustment set screw is disposed adjacent to a valve seat and in a flow path of the relief valve, and a sensor mounting portion of the blowdown adjustment set screw extends outside of the valve body; and securing one or more sensors to the sensor mounting portion of the blowdown adjustment set screw, the one or more sensors being thereby configured to detect a valve event via fluid communication with the flow path through the blowdown adjustment set screw to provide an indication of a valve event for the relief valve.

19. The method of claim 18, wherein the one or more sensors include an acoustic sensor configured to detect an acoustic profile of the valve event via the blowdown adjustment set screw.

* * * * *